United States Patent [19]

Schaefer et al.

[11] Patent Number: 5,505,968
[45] Date of Patent: Apr. 9, 1996

[54] ANTEMORTEM NUTRIENT SUPPLEMENT FOR LIVESTOCK

[75] Inventors: Allan L. Schaefer; Stephen D. Morgan Jones, both of Lacombe; Richard W. Stanley, Red Deer; Ian K. S. Turnbull, Lacombe, all of Canada; John R. Johanns, Grand Island, Nebr.

[73] Assignees: Her Majesty the Queen in right of Canada, as represented by the Department of Agriculture; Agri-Food Canada, both of Canada

[21] Appl. No.: 84,989

[22] Filed: Jul. 2, 1993

[51] Int. Cl.$^6$ .......................... A61K 33/24; A61K 33/34; A61K 33/26; A61K 33/14; A61K 33/00; A61K 38/00; A61K 31/70; A61K 31/355; A61K 31/34; A61K 31/195; A61K 67/02

[52] U.S. Cl. .................. 424/617; 424/630; 424/646; 424/655; 424/680; 424/717; 514/2; 514/23; 514/458; 514/474; 514/561; 426/2

[58] Field of Search .......................... 514/2, 23, 458, 514/474, 561; 424/680, 717, 679, 697, 655, 617, 630, 646; 426/2, 72, 74, 658, 807

[56] References Cited

U.S. PATENT DOCUMENTS

| | | | |
|---|---|---|---|
| 4,192,865 | 3/1980 | Helbig | 514/560 |
| 4,600,586 | 7/1986 | Green | 426/2 |
| 4,839,347 | 6/1989 | Franz | 514/53 |
| 4,853,237 | 8/1989 | Prinkkila et al. | 426/590 |
| 4,871,550 | 10/1989 | Millman | 424/601 |
| 4,904,473 | 2/1990 | Schricker et al. | 424/438 |
| 4,981,687 | 1/1991 | Fregly et al. | 424/679 |
| 5,006,558 | 4/1991 | Poralla et al. | |
| 5,008,248 | 4/1991 | Bywater et al. | 514/23 |
| 5,028,437 | 7/1991 | Jerrett | 424/535 |
| 5,089,477 | 2/1992 | Fregly et al. | 514/23 |
| 5,260,089 | 11/1993 | Thornberg | 426/624 |

FOREIGN PATENT DOCUMENTS

| | | |
|---|---|---|
| 0114104A2 | 7/1984 | European Pat. Off. . |
| 0116484 | 8/1984 | European Pat. Off. . |
| 0164848 | 12/1985 | European Pat. Off. . |
| 0316683 | 5/1989 | European Pat. Off. . |
| 1153049 | 6/1989 | Japan . |
| 2-295428 | of 1990 | Japan . |
| 1575994 | 10/1980 | United Kingdom . |
| 2190821 | 12/1987 | United Kingdom . |

OTHER PUBLICATIONS

Hutcheson, David P., "Nutrient Requirements of Diseased, Stressed Cattle," Veterinary Clinics of North America: Food Animal Practice. vol. 4, No. 3, pp. 523–530, Nov. (1988).
Nockels, Cheryl F., "Effect of Stress on Mineral Requirements," Western Nutrition Conference (1990), pp. 27–32.
Kleiber, Max, "The Fire of Life: An Introduction to Animal Energetics." Robert E. Krieger Publishing Company, New York, (1975), pp. 179–222.
Lee, Byung-O and Son, Jae-Young, "Effect of the Transportation Stress After Administration of Tranquilizers on the Blood Components of Korean Native Goats." Korean J. Anim. Sci., 27(3):154–160, (1985).
Johnson, D. B., et al., "Respiratory Syncytial Virus Vaccine for Stressed Stocker Cattle" in Animal Science Research Report, Oklahoma Agricultural Experiment Station, Jun. (1988), pp. 105–111.
Hails, Michael R., "Transport Stress in Animals: A Review." Animal Regulation Studies, Elesvier Scientific Publishing Company, Amsterdam, 1(1978)289–343.
Kent, J. E. and Ewbank, R., "The Effect of Road Transportation on the Blood Constituents and Behaviour of Calves. III. Three Months Old." Br. vet. J. (1986), 142, 326–335.
Selye, H., "The Birth of The G.A.S." in The Stress of Life, McGraw–Hill Book Company, New York, (1956), pp. 29–53.
Warriss, P. D., "Live Animal Marketing Effects on Carcass and Meat Quality." Agric. Can. Work Planning Meeting, Winnipeg, 1986.
Nash, D. et al., "Evaluating Beef Cattle Operations for Stress–Management Procedures." Beef Production Management, Compendium Food Animal, 971–976. (1960).
The Merck Veterinary Manual: A Handbook of Diagnosis and Therapy for the Veterinarian, Merck & Co., Inc., N.J., 1973, p. 1214.
Church, D. C., "Livestock Feeds and Feeding." Oxford Press, Oregon, (1977), p. 183.
Stott, G. H., "What is Animal Stess and How is it Measured?" J. Anim. Sci., vol. 52, No. 1, (1981), pp. 150–153.
Vogel, W. H., "Coping, Stress, Stressors and Health Consequences." Neuropsychobiology 13:129–135 (1985).
Asterita, M. F., "The Physiology of Stress," Human Sciences Press, Inc., New York, N.Y., 1985, pp. vii–xiii, 1–6.
Axelrod, J., "Stress Hormones: Their Interaction and Regulation." Science, vol. 22, May 1984, pp. 452–459.
Phillips, W. A., et al., "Influence of Preshipment Management on the Adrenal Response of Beef Calves to ACTH Before and After Transit." J. of Animal Science, vol. 54, No. 4, (1982), pp. 697–703.
Phillips, W. A. et al., "Effect of Diet on the Amount and Source of Weight Lost by Beef Steers During Transit or Fasting." Nutrition Reports International, Oct. 1985, vol. 32, No. 4, pp. 765–776.
Lefcourt, A. M., "Usage of the Term 'Stress'0 as it Applies to Cattle." Vlaams Diergeneeskundig Tijdschrift, (1986), Jg. 55, Nr. 4, 258–265.

(List continued on next page.)

Primary Examiner—Raymond Henley, III
Attorney, Agent, or Firm—Finnegan, Henderson, Farabow, Garrett & Dunner

[57] ABSTRACT

The invention relates to an antemortem stress supplement for livestock containing one or more sources of electrolytes including sodium, potassium and magnesium, one or more sources of amino acids including alanine, lysine, phenylalanine, methionine, threonine, leucine, isoleucine, valine, and glutamate, all in a bypass form; and a source of tryptophan. The invention also extends to methods of administering the supplements to livestock to prevent or reduce antemortem stress.

10 Claims, No Drawings

OTHER PUBLICATIONS

Nowak, S. M., et al., "Trait Anxiety is Reflectd in EEG Alpha Response to Stress." Electroencephalography and Clinical Neurophysiology, (1981), 52:175–191.

Galyean, M. L., "Influence of Fasting and Transit on Ruminal and Blood Metabolites in Beef Steers," J. of Animal Science, vol. 53, No. 1, (1981), pp. 7–18.

Johnston, J. D. et al., "Response of Male Holstein Calves from Seven Sires to Four Management Stresses as Measured by Plasma Corticoid Levels." Can. J. Anim. Sci. 56:727–732 (Dec. 1976).

Blecha, F. et al., "Shipping Suppresses Lymphocyte Blastogenic Responses in Angus and Brahman×Angus Feeder Calves," J. of Animal Science, vol. 59, No. 3, (1984), pp. 576–583.

Locatelli, A. et al., "Adrenal Response in the Calf to Repeated Simulated Transport." Br. vet. J. (1989) 145:517–522.

Mitchell, G. et al., "Stress in Cattle Assessed After Handling, After Transport and After Slaughter." The Veterinary Record, vol. 123, No. 8, Aug. 20, (1988), pp. 201–205.

Lofgreen, Glen P., "Nutrition and Management of Stressed Beef Calves." Veterinary Clinics of North America: large Animal Practice, vol. 5, No. 1, Mar. (1983), pp. 87–101.

Wythes, J. R., et al., "Pre slaughter handling of cattle: The availability of water during the lairage period." Aust. Vet. J., May (1985), v. 62(5), pp. 163–165.

Murata, H., et al., "The Effects of Road Transportation on Peripheral Blood Lymphocyte Subpopulations, Lymphocyte Blastogenesis and Neutrophil Function in Calves." Br. vet. J. (1987), 143, pp. 166–174.

Morisse, J. P., et al., "Le Stress Chez le Veau: Consequences Physiologiques, Zootechniques et Sanitaires." Rec. Med. Vet., 1988, 164(10) 849–854.

Shorthose, W. R., et al., "Transport of Sheep and Cattle." 34th International Congress of Meat Science and Technology, Congress Proceedings, part A, Aug. 29–Sep. 2, 1988, pp. 122–129.

Ruppanner, R. et al., "Metabolic and Cellular Profile Testing in Calves Under Feedlot Conditions: Minerals, Electrolytes, and Biochemical Components—Changes Over Time in Feedlot." Am. J. Vet. Res., 39:(1978) pp. 845–849.

Stephens, D. B., "Stress and its Measurement in Domestic Animals: A Review of Behavioral and Physiological Studies Under Field and Laboratory Situations." Advances in Veterinary Science and Comparative Medicine, vol. 24, pp. 179–210, (1980).

Stermer, R. A. et al., "Feeder Cattle Stress During Handling and Transportation." Transactions of the ASAF, Paper No. 81–6001, (1982), pp. 246–249.

VonTunglen, David L., "The Effects of Stress on the Immunology of the Stocker Calf." The Bovine Proceedings, No. 18, Apr. (1986), pp. 109–112.

Woods, G. T. et al., "A Three Year Comparison of Acute Respiratory Disease, Shrink and Weight Gain in Preconditioned and Non–preconditioned Illinois Beef Calves Sold at the Same Auction and Mixed in a Feedlot." Can. J. comp. Med., vol. 37, Jul. (1973), pp. 249–255.

"Preslaughter Management and Dark–Cutting in the Carcasses of Young Bulls." Can. J. Anim. Sci. 61:205–208 (Mar. 1981).

Lambooy, E. and Hulsegge B., "Long–Distance Transport of Pregnant Heifers by Truck." Applied Animal Behaviour Science, 20(1988) 249–258.

Cole, N. A. et al., "The Effect of Pre–Fast Diet and Transport on Nitrogen Metabolism of Calves." J. Anim. Sci. 1986, 62:1719–1731.

Cole, N. A. et al., "Influence of Prefast Feed Intake on Recovery From Feed and Water Deprivation by Beef Steers." J. Anim. Sci., vol. 60, No. 3, (1985), 772–780. Crookshank, H. R., "Effect of Transporation and Handling of Calves Upon Blood Serum Compostion." J. Anim. Sci. vol. 48, No. 3 (1979), 430–435.

Cole, N. A., "Influence of Realimentation Diet on Recovery of Rumen Activity and Feed Intake in Beef Steers." J. Anim. Sci., vol. 61, No. 3, (1985), 692–701.

Eldridge, G. A., "Road Transport Factors That May Influence Stress in Cattle." 34th International Congress of Meat Science and Technology Congress Proceedings, Part A, Aug. 29–Sep. 2, (1988), Australia, 148–149.

Schaefer, A. L., "The Effects of Fasting and Transportation on Beef Cattle. 1. Acid–Base–Electrolyte Balance and Infrared Heat Loss of Beef Cattle." Livestock Production Science, 20 (1988) 15–24.

Sinclair, K. D., "The effect of haulage distance on the performance and welfare of beef bulls and the eating quality of the beef." An. Prod. 1992, 54(3), p. 496.

Fraser, A. F., 1986. Applied Animal Behaviour Science, 15:1–5.

Warriss, P. D. 1985. Pig News and Information. vol. 6, No. 2, pp. 155–157.

Price, M. A. and Tennessen, T., 1981. Can. J. Anim. Sci. 61:205–208.

Jacob, R., Piwnnica–Worms, D., Horres, C. R. and Lieberman, M. 1985. The Journal of General Physiology. 86:891–895.

Jones, S. D. M., Schaefer, A. L., Tong, A. K. W. and Vincent, B. C., 1988. Livestock Production Science, 20:25–35.

Gilson, L. and Kennedy, A. D., 1992. Can. J. Anim. Sci. 72:989.

Fraser, A. F., 1979. Appln. Anim. Ethol., 5:1–4.

Feedstuffs, May 18, 1993. Typical Composition of Feeds for Cattle and Sheep, 1992–93, pp. 35–40.

Chart from Heartland Lysine, Inc., Chicago, Ill., Apparent Ileal Digestibility of Crude Protein and Essential Amino Acids in Feedstuffs for Swine, 1992.

Schaefer, A. L., Jones, S. D. M., Tong, A. K. W., and Young, A. 1990. Can. J. Anim. Sci. 70:107–119.

Schaefer, A. L., Jones, S. D. M., Tong, A. K. W., and Vincent, B. C. 1988. Livest. Prod. Sci. 20:15–24.

Post, T. B. 1965. Aust. J. Biol. Sci. 18:1235–1239.

Wajda, S., Wichlacz, H. 1986. Fleischwirtschaft. 67:962–964. (Abstract Only).

Ozutsumi, K., Ito, K., Kawanishi, T., Yamazaki, T. and Karia, Y., 1984. Jpn. J. Zootech, Sci., 55:735–740. (Abstract Only).

Kilgour, R., 1988. 34th Int. Congr. Meat. Sci. Technol., Congr. Proc. Part A., Brisbane, Australia, pp. 130–138.

Jones, S. D. M. and Tong, A. K. W., 1989. Can. J. Amin. Sci., 69:649–654.

Jones, S. D. M., Schaefer, A. L., Tong, A. K. W. and Vincent, B. C. 1988. Livest. Prod. Sci. 20:25–35.

Morrisse, J. P., Cotte, J. P., and Huonnic, D. 1985. RTVA 211:27–31. (Abstract Only).

Jagos, P., Illek, J. Doubek, J., Jurajdova, Jana, 1985. Acta Vet. Brno. 54, 1985:41–51.

Armentano, L. E. and Solorzano, L. C. 1987. 10th International Mineral Conference. Pitman Moore, pp. 53–64.

Jones, S. D. M., Schaefer, A. L., Robertson, W. M. and

Vincent, B. C. 1990. Meat Sci. 28:131–139.

Eldridge, G. A., Winfield, C. G. and Cahill, D. J., 1988. Australian Journal of Experimental Agriculture, 1988, 28:155–159.

Warriss, P. D., 1986. Research Program Service, Minister of Supply and Services Canada, 1987, Winnipeg, Manitoba, Oct. 1986, pp. 7–41.

Johnston, J. D. and Buckland, R. B., 1976. Can. J. Anim. Sci. 56:727–732.

Cole, N. A., Camp, T. H., Rowe, L. D. Jr., Stevens, D. G., and Hutcheson, D. P., 1988. Am. J. Vet. Res. 49:178–183.

Ruppanner, R., Norman, B. B., Adams, C. J., Addis, D. G., Lofgreen, G. P., Clark, J. G., and Dunbar, J. R., 1978. Am. J. Vet. Res. 39:845–849.

Hutcheson, D. P., and Cole, N. A. 1986. J. Anim. Sci. 62:555–560.

Kenny, F. J. and Tarrant, P. V. 1987. Livestock Prod. Sci. 17:63–75.

Mikulik, A., Bibova, J., Zemanova, D. and Dvorak, Z. 1987. 33rd Int. Cong. Meat Sci. Tech. Proc. vol. 1, Helsinki: 144–145.

Locatelli, A., Agnes, F. and Sartorelli, P. 1987. Archivio Veterinario Italiano 38:81–85.

Stermer, R. A., Camp, T. H. and Stevens, D. G. 1982, Trans. ASAE (Am. Sco. Agric. Eng.) 25:246–249.

Uanaua, A. P. and Buitrago, J. M. G., 1985. Reprod. Nutr. Develop. 25:599–603. (English Abstract Only).

Kent, J. E. and Ewbank, R. 1986. Br. Vet. J. 142:326–335.

Chumachenk et al., "Preparing pigs for fattening and transport—by adding sodium succinate as stress reducing agent to feed, for specified periods", Database WPI Week 9025, AN 90–191238 (1989).

Levakhin et al., "Stress prevention in cattle during their transport—by incorporating electrolyte composition into feed for prescribed time before transport", Database WPI Week 9147, AN 91–345083 (1991).

Showa Denko KK, "Improving the meat quality of ruminants—by feeding L-tryptophan or its salt", Database WPI Week 8930, AN 89–216284 (1989).

Boles et al., "Effect of oral loading of acid or base on the incidence of pale soft exudative pork (PSE) in stress-susceptible pigs", Meat Science 37: 181–184 (1994).

Schaefer et al., "The effect of ante mortem electrolyte therapy on animal physiology and meat quality in pigs segregating at the halothane gene", Can. J. Anim. Sci. 73:231–240 (1993).

Wajda et al., "Einfluss der melassetrankung auf pH–wert und Farbe von Bullenfleisch", Fleischwirtschaft 67: 962–964 (1987).

Jones, S. D. M., Schaefer, A. L. and Tong, A. K. W. 1992. Can. J. Anim. Sci. 72:791–798.

Kilgour, R. and Dalton, C. 1984. Livestock Behavior. Handling and Welfare. pp. 275–278.

Morisse, J. P., Cotte, J. P. and Huonnic D. 1988. Rec. Med. Vet. 164:849–855.

Souci, et al. "Food Composition and Nutrition Tables" 1989/90, pp. 124–125.

ANTEMORTEM NUTRIENT SUPPLEMENT FOR LIVESTOCK

FIELD OF THE INVENTION

This invention relates to nutrient supplements useful in the preventative or restorative treatment of antemortem stress in livestock.

BACKGROUND OF THE INVENTION

Many of the management practices to which livestock are subjected during the marketing period, particularly in the antemortem environment, can be potent physiological and psychological stressors (see Kilgour, 1988; Warris 1986; Fraser, 1979; Stermer et al., 1982; Kent et al., 1986; Mikulik et al., 1987; Kenney et al., 1987; Loccatelli et al., 1987; Cole et al., 1988; and Eldridge, 1988). Factors such as the withholding of feed (Ozutsumi, 1984; Schaefer et al., 1988; Jones et al., 1988; and Jones et al., 1990), mixing of unfamiliar animals (Eldridge, 1988), fighting (Unanua et al., 1985), as well as transport and weather (Jones et al., 1989) are commonly reported insults which can lead to abnormal physiology in these animals, carcass loss and degraded meat quality. In cattle, it has been demonstrated that handling and transport per se can be more potent stressors, based on blood cortisol levels, than 48 hours of water withdrawal or surgical castration and dehorning (Johnston et al., 1976). In addition to the above, there is a growing concern that animal welfare in the pre-slaughter environment may be degraded.

A substantial scientific effort has been made to identify and document the kinds and nature of responses to antemortem stress. Such work has included an examination of the role of sodium, potassium and fluid shifts (Ruppanner et al., 1978; Jagos et al., 1985; Post 1965; and Armentano et al., 1987) and acid/base and electrolyte values associated with poor meat quality (Schaefer et al., 1988; and Jones et al., 1988). However, the assessment of management practices that would reduce or eliminate these stressors has been less well understood. With the exception of research on the use of high energy feeds (Morisse et al., 1985; Hutcheson et al., 1986; and Wajda et al., 1987) few studies have been undertaken to specifically improve carcass yield and meat quality by manipulating pre-slaughter nutrition and electrolyte management in the antemortem environment.

In a 1988 study (Schaefer et al., 1990) involving two of the inventors, animals which had been subjected to transport stress were treated with solutions containing glucose or a mixture of electrolytes and food grade pure sources of amino acids. The results showed some apparent improvement in meat quality and carcass yield with the glucose and electrolyte treatments. No benefit was reported from the inclusion of food grade amino acids. Importantly, this study was restricted to a restorative approach to improving meat quality and carcass yield, that is the compositions were provided to animals only after the animals had experienced stresses approximating the antemortem environment.

The literature discloses electrolyte compositions for use in the treatment of diseased states in animals, for instance diarrhea or dehydration (see for example U.S. Pat. No. 5,008,248 to Bywater et al.; U.S. Pat. Nos. 4,981,687 and 5,089,477 to Fregly et al.; U.S. Pat. No. 5,028,437 to Jerrett; U.S. Pat. No. 4,839,347 to Franz and published European Patent Application No. 84300179 to TechAmerica Group Inc.). Electrolyte compositions are also taught to enhance athletic performance in humans or race horses (see for example U.S. Pat. No. 4,853,237 to Prinkkila et al.; and U.S. Pat. No. 4,871,550 to Millman). Since the nature of antemortem stress is uniquely different from other types of stress such as clinically identified disease or the desire to enhance athletic performance, the prior art compositions formulated for such different utilities are not applicable for the treatment of antemortem stress. Such prior art compositions often include ingredients in ineffective or harmful concentrations. For instance, many of the compositions include electrolytes in high concentrations which would be hypertonic and damaging to otherwise healthy animals. Also, such compositions often include other ineffective and potentially harmful ingredients for otherwise healthy animals, including caffeine, citric acid, pyruvate, and glycerol.

There is a need for a composition which has a preventative effect in reducing the antemortem stress causes of degraded meat quality and decreased carcass yield.

SUMMARY OF THE INVENTION

The results achieved in the Schaefer et al., 1990 study encouraged the inventors to develop and evaluate nutrient compositions which were beneficial in preventing antemortem stress, that is compositions which could be administered prior to shipping animals in order to mitigate the effects of handling, management and transport. Surprisingly, the inventors found that specific compositions formulated as a nutrient supplement were effective in preventing and/or lessening the effects of antemortem stresses if administered to the animals in a reasonable period of time prior to transport. Such compositions were also found to have a restorative effect if administered after the effects of antemortem stress had occurred, provided a reasonable period of time elapsed between treatment and slaughter. The effectiveness of the compositions of the present invention was evident from the improved results obtained for live weight retention and meat quality, and carcass yield in the slaughtered animals.

Broadly stated, the present invention provides an antemortem nutrient supplement for livestock, which includes:
- one or more sources of certain electrolytes, including sodium, potassium and magnesium, preferably in concentrations in the supplement which are hypotonic;
- one or more sources of certain amino acids including alanine, lysine, phenylalanine, methionine, threonine, leucine, isoleucine, valine, tryptophan and glutamate, most or all of which are provided in a bypass form; and
- preferably one or more sources of energy.

The source of energy may be eliminated, reduced or altered for certain animals, for example swine, where excessive concentrations of some sugars such as glucose are found to be detrimental to meat quality factors. Energy sources such as milk sugars, propylene glycol, starches may be used.

The composition is preferably formulated as a solid nutrient supplement for inclusion with the regular feed for the animal. The composition may also be formulated in a premix powder or in a liquid form for administration as a liquid consumable or as a drench. To enhance palatability, a flavour agent may be included to ensure that the animal takes a sufficient amount of the supplement ad libitum. Palatability is also enhanced by formulating the supplement from ingredients which provide the amino acids and energy source in familiar forms to the animal.

When administered in a preventative manner, the supplement is provided to the animal prior to transport, preferably 6–24 hours, and more preferably 6–12 hours prior to transport. When administered in a restorative manner, the supplement is provided to the animal a reasonable time prior to slaughter, preferably 6–24 hours prior.

The supplement of this invention has been proven to be efficaceous in reducing live and/or carcass weight loss and/or meat quality degradation in cattle, swine, elk and bison which had been previously stressed.

The term "livestock", as used herein and in the claims, is meant to include domestic ruminant and monogastric animals, including swine, horses, cattle (*Bos taurus* and *Bos indicus*), and domestic ungulates such as bison, sheep, lamb, deer, moose, elk, caribou and goats.

The terms "antemortem period" and "antemortem stress", when used herein and in the claims, refer to the time and stresses imparted to animals during pre-slaughter treatment, including transport, holding, management, and handling. The terms are also meant to include stresses imparted during other animal marketing practices, such as transporting animals for other than slaughter purposes.

The term "bypass form", when used herein and in the claims with respect to amino acids, is meant to refer to amino acids provided from sources such as bypass, chelated or protected proteins. In such forms, the amino acids are not substantially degraded in the rumen of ruminant animals, but pass through to the abomasum comparatively intact. In general, in the context of this invention, an amino acid is considered to be in a bypass form if greater that about 40% of the protein in that source is in a bypass form. Without limitation, preferred sources of the bypass amino acids include distillers grain, alfalfa meal, corn gluten meal, skim milk powder, whey powder, soybean, caesin, cottonseed meal, feather meal, blood meal, bone and meat meal, and fish meal.

The term "hypotonic", as used herein and in the claims refers to concentration of an ingredient, primarily related to the concentrations of the electrolytes, in an amount which is not significantly greater than the concentration of that ingredient found in the physiological fluids of the animal such as plasma, interstitial and intracellular fluids (i.e. the isotonic concentration). This concentration is preferred so that the supplement provided to the animal will have a lower osmotic pressure in respect of the salts than that of the physiological fluids. Since many animals experiencing antemortem stress are dehydrated, the nutrient supplement is preferably formulated to avoid hypertonic liquids (or solids which will result in hypertonic concentrations). Hypertonic solutions would simply draw more fluid from the tissue and exacerbate tissue loss.

DESCRIPTION OF THE PREFERRED EMBODIMENTS

Without being bound by the same, it is believed that the nutrient supplements and the methods of administration in accordance with the present invention provide the following effects or benefits from the individual ingredients:

a) The electrolyte imbalance from antemortem stress is corrected and/or normalized by the inclusion of Na, K and Mg, and preferably bicarbonate.

b) The hypoglycaemic condition that arises from antemortem stress is corrected and/or normalized by the inclusion of a source of energy, preferably glucose, together with the gluconeogenic precursor alanine.

c) The dehydration associated with antemortem stress is corrected and/or normalized either by the inclusion of water in the supplement itself (in the liquid forms of the supplement) or by the provision of water in conjunction with the supplement (in the solid forms of the supplement).

d) Net protein degradation and carcass loss arising from antemortem stress is attenuated by the provision of specific amino acids including leucine, isoleucine and valine, which stimulate protein synthesis and reduce protein degradation, together with the essential amino acids including phenylalanine, lysine, threonine and methionine needed in protein synthesis. As stated above, the amino acids are provided in a bypass form to ensure that they can be utilized by ruminant animals and to ensure that there is a prolonged effect from the supplement after administration to the animal.

e) Hypertension and anxiety experienced from antemortem stress is lessened by including the amino acid tryptophan, which is the neurotransmitter precursor to scrotonin, together with the blood pressure lowering agent magnesium sulphate. This amino acid is provided in a bypass and/or food grade form.

f) The effects of meat quality degradation from antemortem stresses are also lessened by the combined action of electrolytes, which promote acid/base stability and buffering, with $NH_3$ recipients (glutamate). Protein degradation in animals results in the release of $NH_3$ groups, which can lead to high pH conditions known to contribute to dark cutting problems in meat quality. The provision of glutamic acid (glutamate) in the supplement alleviates the $NH_3$ buildup problem. The glutamate, or glutamic acid, is preferably provided in relatively large concentrations, compared to that of other amino acids, to provide an ammonia buffering effect.

Other beneficial ingredients in the supplements of the present invention include one or more of any of the following ingredients: the vitamins B, C and E, the amino acids arginine, histidine and cysteine, and the trace minerals chromium, selenium, calcium, copper, iron and zinc.

The source of energy is met with the inclusion of simple or complex carbohydrates or fats. Preferable energy sources include one or more of glucose, sucrose, fructose, galactose, dextrose, propylene glycol, lactose, complex carbohydrates such as starch, and fat. Several of these ingredients are beneficially included to delay the effect of the energy source. For instance lactose, starch, propylene glycol, sucrose and fat provide prolonged energy sources. The energy source is preferably provided in a form which is palatable and familiar to the animal. Such sources as kraft whey powder, molasses, and skim milk powder are economic forms of energy sources which are particularly preferred alone, or in admixture with purer energy sources such as glucose, sucrose and dextrose. Other useful energy sources will be evident to persons skilled in the art.

The electrolytes in the supplement of the present invention include Na, K, Mg and preferably bicarbonate. The electrolytes may be provided in any economical form as water soluble salts or as chelates which release the electrolytes in solution. Most preferred combinations include sodium chloride, sodium bicarbonate, potassium chloride, potassium bicarbonate, and magnesium sulphate. Preferably, to maintain the chloride concentration at an acceptable level (preferably hypotonic), the electrolytes are paired as sodium chloride and potassium bicarbonate, or as sodium bicarbonate and potassium chloride. Chelated forms of magnesium such as magnesium aspartate hydrochloride may be used.

The electrolytes are most preferably provided in concentrations in the supplement which are hypotonic. In respect of liquid forms of the supplement, each electrolyte is preferably included in an amount which is hypotonic on a wt/vol basis. The concentration will vary, depending on the size of the animals, the solubility of the electrolyte, and the physical form of the supplement. For instance, the NaCl concentration in plasma is about 1.0%. Assuming that a 500 Kg cow consumes daily approximately 20 liters or more of water or electrolyte fluid, the supplement is most preferably formulated to provide about 20 g NaCl in 20 L. A range of 2–40 g can be tolerated, with the most preferred range being 10–20 g. Somewhat higher concentrations of sodium chloride can be tolerated provided the animal is provided access to water. The hypotonic amounts of the other electrolytes may be calculated as with NaCl above. Lower amounts (relative to sodium chloride) of magnesium and potassium salts are preferred, as set out hereinbelow, to form hypotonic supplements.

In respect of solid forms of the supplement, each electrolyte ingredient preferably included in an amount which provides a solution which is hypotonic in respect of that electrolyte ingredient when mixed with the normal daily liquid intake for that animal (for instance about 20 L or more for a 500 Kg cow). Assuming that an animal consumes about 1 Kg of supplement in a day, amount of 10–40 g of the sodium and potassium salts are preferred. If the animal then consumes a minimum of about 20 L of water, this has the same resulting effect as if the animal had consumed a hypotonic solution.

It should be evident to persons skilled in the art that, given the wide range in ingredient concentration efficacy and the variable consumption of solids and liquids between animals, the above preferred amounts of the electrolytes are only approximate and will be varied depending on the type of formulation (solid vs. liquid), the nature of the electrolyte ingredient (solubility etc.), and the average solid and liquid intake of the animals being treated.

The amino acids are most preferably provided in a bypass protein form to ensure that a sufficient concentration bypasses the rumen and to ensure that the supplement has a prolonged effect. The amino acids are most preferably provided in a feedstuff acceptable to the animals, most preferably in a palatable form. The amounts of bypass proteins in typical feed materials may be calculated or determined from available tables (see for example Feedstuffs, May 18, 1992, pp 35–40). The aminograms for many feedstuffs may be analytically determined or provided from published literature (see for example Chart from Heartland Lysine, Inc., Chicago Ill., Apparent ILEAL Digestibility of Crude Protein and Essential Amino Acids in Feedstuffs For Swine, 1992).

Certain amino acids such as tryptophane may not be readily available in a bypass form and may be provided in a food grade chemical form. Caesin is an alternate preferred source of typtophane in a bypass form. Also, certain bypass amino acids may be supplemented with the food grade chemical forms, where the latter form is economical. These include lysine, threonine and methionine.

Particularly preferred bypass sources of the amino acids, include corn gluten meal, skim milk powder and whey powder. These sources are economic, palatable and often familiar to the animal. Other bypass forms of amino acids include distillers grain, alfalfa meal, soybean meal, caesin, cotton seed meal, hydrolysed feather meal, blood, bone and meat meals, and fish meals (including anthropods).

The supplement of the invention is most preferably administered to the animal in a solid form, in admixture with the normal feed. Alternatively, the composition may be provided in a liquid form as a liquid consumable or drench. As a liquid consumable or as a solid product, the supplement should be palatable to ensure that the animal consumes a sufficient quantity.

While many of the preferred ingredients are themselves provided from a palatable source, it is often beneficial to include a flavour agent to the liquid consumable and solid products. Flavours may include ingredients such as oat groats and barley, added for purposes other than flavour. Other known flavours which mask either the unfavourable flavour or odour of the product may be used. Such products as Dairy Lure and Dairy Charm, (trade mark products available from Kemin Industries Inc., Des Moines, Iowa, U.S.A.), and Dairy Krave 400 (Feed Flavours International Inc., Wheeling, Ill., U.S.A.), are examples of suitable flavours.

The solid product is preferably formulated with typical feed carriers and binders, known in the animal feedstuffs industry. Exemplary carriers include cereal grains and grain or grass byproducts. The term "grain" includes such products as oats, barley, wheat, cannola, rye, sorgum, millet, corn, legumes, the latter including alfalfa and clover, and grasses including brome, timothy or fescue. Particularly preferred carriers include barley or other grains, grain or legume screenings, and oat groats. Often, an ingredient serves more than one purpose in the supplements of the present invention. For instance, if dextrose is used as an energy source in sufficient quantity, it also acts as a carrier. Similarly, molasses as an energy source also serves as a binder when combined with Molastix (Salsbury Laboratories Ltd., Kitchener, Ontario, Canada). Clays may also be used as binders.

The respective amounts of the individual ingredients varies from animal to animal. Generally, as a guide, based on a body weight/three quarters power scale, for a 500 Kg ruminant animal consuming about 20 L of water in a day, the preferred ranges of ingredients are as follows (g ingredient/ 500 Kg animal):

| Energy source (based on glucose) | | 20–2000 g (pref. 50–1000) |
|---|---|---|
| Electrolytes (NaCl, KHCO$_3$, each) | | 2–40 g (pref. 10–20) |
| (MgSO$_4$) | | 1–20 g (pref. 10) |
| Amino Acids | (all) | 0.5–100 g (pref 2–10) |
| | (leucine) | 15–25 g |
| | (glutamic acid) | 40–66 g |

The amino acids leucine and glutamic acid (glutamate) are preferably added in amounts higher than the other amino acids. These increased concentrations have been found by the inventors to be effective in reducing meat quality degradation, presumably by stimulating protein synthesis (leucine) and in lowering the concentrations of NH$_3$ groups released from protein degradation (glutamic acid conversion to glutamine). Without being bound by the same, it is believed that the latter reaction involving glutamate or glutamic acid, has a buffering effect on pH in the animal, which ultimately reduces the incidence of dark cutting in the meat products.

As indicated hereinabove, the amounts of any particular ingredient in the supplements of the invention will vary according to such factors as the form of the ingredient, the form of the supplement, and the type and size of the animals to be treated. As a guideline, in formulating solid or liquid supplements in accordance with the present invention, exemplary ingredients (if present) are most preferably included in the following percent by weight amounts:

| Feed Grade Ingredients (preferred range is 0.1–4 times the amounts set out below: | |
|---|---|
| Flavour | 1% |
| Methionine | 0.5% (as pure source) |
| Lysine | 0.3% (as pure source) |
| Tryptophan | 0.4–1% (as pure source) |
| Threonine | 0.15% (as pure source) |
| Magnesium sulphate | 1–2% (as epsom salts) |
| Potassium chloride | 1.5% |
| Sodium chloride | 2–4% |
| Potassium bicarbonate | 4% |
| Sodium bicarbonate | 4% |
| Dextrose | 20% |
| Animal or Vegetable fat | 2% |
| Molasses | 4% |
| Bypass Proteins as Sources of Amino Acids: | |
| Cotton seed meal | 15–50% |
| Corn gluten meal | 15–40% |
| Distillers grain | 30–60% |
| Hydrolysed feather meal | 10–20% |
| Fish meal | 20–30% |
| Meat and bone meal | 20–40% |
| Blood meal | 10–20% |
| Sources of Lactose: | |
| Skim milk powder | 2.5–15% |
| Whey powder | 10–20% |

The supplement is most preferably administered as a preventative nutrient supplement before the animal is transported (i.e. prior to the infliction of antemortem stress factors). The supplement is preferably administered 6–24 hours prior to transport and most preferably 6–12 hours prior to transport. Preventative supplements may be formulated as solid feed supplements (preferably as a pelletized solid for admixture with the normal food for the animal), powder premixes for dilution into liquid for either drench or liquid consumable products, or as concentrated liquids for drenches or liquid consumables (with or without dilution).

When used as a restorative treatment, the supplement is administered in any of the above forms after the animal has been influenced by antemortem stress conditions, for instance after transport. After administering the supplement, the animal is held for a reasonable period of time to allow restoration, preferably 6–24 hours and most preferably about 12–24 hours prior to slaughter.

The invention is further illustrated in the following non-limiting examples:

EXAMPLES

Four compositions were formulated for use as nutrient supplements in accordance with the present invention. The supplements were used, alongside controls, to illustrate the efficacy of the supplements and the modes of administration in reducing the antemortem stress effects on meat quality and/or carcass yield. The supplements were as follows:

Supplement 1(a): Drench or Liquid Consumable Nutrient Supplement

The ingredients set out below were admixed. Certain amino acids were provided, in addition to the bypass forms, as feed grade pure ingredients, as indicated. The ingredients, with gram/head quantities were as follows: Tryptophane (Tr)-4; corn gluten meal (CG)-146; skim milk powder (SM)-60; whey powder (WP)-140; NaCl-20; KCl-15; $MgSO_4$-10; and flavour (Dairy Krave 400)-5. Lactose was provided in the composition in the amount of 130 g, primarily from skim milk and whey powder. The aminogram content of the supplement is provided in Table 1(a) at the end of the examples. The aminogram content of the supplement is provided in Table 1(a) at the end of the examples. The amino acid content from the various pure and bypass forms is set out, for each amino acid, as % and gram amounts. The supplement was administered by mixing the product with water. When used as a drench, the supplement was mixed at 400 g/L and administered to the animal at a rate of 1 L/animal, based on a 500 Kg animal.

Supplement 1(b): Solid Premix Pellet Nutrient Supplement

The ingredients set out below were admixed and pelletized. Certain amino acids were provided, in addition to the bypass forms, as feed grade pure ingredients, as indicated. The ingredients, with gram/head quantities were as follows: Tryptophan(Tr)-5; corn gluten meal (CG)-185.25; skim milk powder (SG)- 75; whey powder (WP)-75; methionine (Me)-2.5; Threonine (Th)-0.75; Lysine (Ly)-1.5; NaCl-20; $KHCO_3$-20; $MgSO_4$-10; flavour (Dairy Lure)-5; dextrose 100. Lactose was provided in the composition in the amount of 130 g, primarily from the skim milk and whey powders. The aminogram content of the supplement is provided in Table 1(b). The supplement was administered a bulk mixable premix with other cattle feed, at a dose of 500 g per head.

Supplement 1(c): Solid Shrinkless Pellet Nutrient Supplement

The ingredients set out below were admixed and pelletized. Certain amino acids were provided, in addition to the bypass forms, as feed grade pure ingredients, as indicated. The ingredients, with gram quantities, on a gram/head basis, were as follows: Tryptophan(Tr)-4; barley carrier (B)-454; oat groats (OG)-100; corn gluten meal (CG)-150; skim milk powder (SM)-25; whey powder (WP)-160; invert sugar (sucrose)-19.2; NaCl-20; KCl-15; $MgSO_4$-10; flavour (Dairy Lure)-1; and binder (Molastix or Canapell, the latter being a bentonite clay from Canadian Clay Products, Wilcox, Saskatoon, Canada))-1. Lactose was provided in the composition in the amount of 126 g, primarily from the skim milk and whey powders. The aminogram content of the supplement is provided in Table 1(c). The supplement was administered with familiar feed as a top dressing at a dose of 1 Kg/head.

Supplement 1(d): Solid Pellets for Beef Nutrient Supplement

The ingredients set out below were admixed and pelletized. Certain amino acids were provided, in addition to the bypass forms, as feed grade pure ingredients, as indicated. The ingredients, with gram/head quantities were as follows: Tryptohphan (Tr)-4; corn gluten meal (CG)-150; skim milk powder (SM)-25; whey powder (WP)-160; screenings (SC) (legume screenings)-554; invert sugar-19.2; NaCl-20; $MgSO_4$-10; flavour (Dairy Charm)-1; and binder (Canapell)-1. Lactose was provided in the amount of 126 g, primarily from skim milk powder and whey powder. The aminogram content of the supplement is provided in Table 1(d). The supplement was administered to the animal with familiar feed at a dose of 1 Kg/head.

Example 1

The preventative efficacy of a drench composition in accordance with the invention was tested. Ninety six bulls, weighing 545 Kg (av) were divided amongst 5 treatments, as set out below. For those groups receiving a drench, the composition was as set out as Supplement 1(a) above. Animals received a dose which included ½, 1× or 2× the solid amounts set out for supplement 1(a). All animals were brought into a handling area and either drenched or sham drenched, prior to being loaded onto commercial transport carriers. The animals were subjected to four hour transport and then off loaded into pens at the research centre. The cattle were held overnight (18 hours) prior to slaughter the following morning. All animals had ad libitum access to water while in lairage, with the exception of the control group which had no water. The carcass yield data after slaughter is set out in Table 2. It is evident that the half strength drench animals displayed a greater retention of carcass weight than either control or water only animals. Increasing doses as a drench did not improve efficacy, based on carcass weight.

TABLE 2

| Treatment | Control no water | Water | Drench ½ | Drench 1X | Drench 2X |
|---|---|---|---|---|---|
| No. Animals | 20 | 20 | 19 | 20 | 17 |
| Carcass retained* | 0 c | 5 b | 9 a | 7 a,b | 7 a,b |

*kg, compared to control
a–c Means within a row followed by different letters differ (P ≧ 0.05)

Example 2

This example is included to illustrate the efficacy of solid and drench supplements in reducing the incidence of dark cutting (degraded meat quality). The supplements were administered prevantatively, that is prior to shipping the animals. Three trials were performed.

Trial 1—In collaboration with a commercial feedlot, one hundred eighty one bulls weighing 175 Kg (av) were divided into three treatment groups as control (no electrolyte), A.M. treatment (supplement in the feed for 24 hours pre-shipment) or P.M. treatment (supplement in the feed for 12 hours pre-shipment). The supplement was as set out as 1(c) above. Following treatment, the cattle were loaded onto commercial carriers, transported for approximately three hours to a commercial abattoir and slaughtered. Dark cutting was analyzed by Canadian grading practices as B2 grades (see Canada Agriculture Products Standards Act, Beef Carcass Grading Regulations, P.C. 1985, 3688; Note—under 1993 Canadian legislation, dark cutting is now graded B4). The incidence of dark cutting in the control group was 11.5%, while the A.M. and P.M. treatment groups had 8.0% dark cutting. This is a significant reduction in dark cutting (approximately 30%), with meaningful economic results to both the farmer and meat processing industry.

Trial 2—The incidence of dark cutting was also evaluated according to U.S. standards. The incidence of dark cutting in feedlot bulls in the U.S. is in the order of 20%. This is extremely undesirable and expensive. In this trial, several thousand animals per year were processed through the feedlot on a two point program. Firstly, the animals were offered a solid supplement (1(b) above) in the feed for 24 hours prior to shipping. If animals failed to consume the target level of electrolyte in the feed, then the cattle were actively treated with a drench supplement (1(a) above. After approximately two thousand animals were treated, the incidence of dark cutting from this feedlot was found to be less than one percent, compared to 5–15 percent dark cutters amongst untreated animals from the same feedlot.

Trial 3—Cattle raised under specific diet and handling conditions, such as 4H animals, often experience an exceptionally high incidence of dark cutting due to the stress of transport and handling. The dark cutting incidence is often reported to be approximately 40%. In this trial, one 4H club (37 animals) was placed on a supplement program, wherein the animals were allowed to consume either or both of a liquid consumable product (supplement 1(a) above) or a solid product (supplement 1(c) above) 12–24 hours prior to transport. Approximately 80% of the members complied with the program. The incidence of dark cutters was reduced to only one animal, which was a non-compliance animal.

Example 3

This example is included to demonstrate the efficacy of the supplements on retention of live and carcass weight when administered pre- and post-transport. The animals treated were cattle coming off pasture. When removed from this environment, it is known that cattle can suffer substantial live and carcass weight loss.

Trial 1—Sixty two yearling cross-bred steers and heifers were divided into two treatment groups of control (water only) and supplement treated. The cattle were raised on barley/triticale pastures prior to the trials. Twenty four hours prior to shipment the treated cattle received ad libitum access to supplement 1(a) in a liquid consumable form. All cattle were then moved to handling facilities, weighed and subjected to a one hour truck transport prior to being off-loaded and again given access to the same liquid supplement (or water only for control group). The animals were weighed again the following morning. The live weight loss for the control group was 6.7%, while the treatment group lost 4.9%. The supplement of the invention was thus efficaceous with respect to retaining live weight in the animals.

Trial 2—To test the repeatability of the above trial in a commercial setting, two successive trials were conducted on pasture raised cattle from a commercial ranch. Over a period of two years trials were conducted on 168 yearling cattle weighing 340 Kg (av) raised on perennial pasture. The animals were brought into a handling facility, sorted into two control groups (no water and water only) and a treatment group (offered a liquid consumable product (supplement 1(a) above) ad libitum overnight). The animals were then subjected to a two or three hour transport to an auction facility on the following day. While at the auction facility, the animals were placed on their respective treatments for a further 8 to 10 hours and then weighted prior to sale. The results of live weight loss are set out in Table 3.

TABLE 3

| Treatment: | Control no water | Control water only | Supplement |
|---|---|---|---|
| Year 1 | | | |
| No. animals | 23 | 23 | 24 |
| Live wt loss % | 7.9 | 6.4 | 3.5 |
| Year 2 | | | |
| No. animals | — | 30 | 68 |

TABLE 3-continued

| Treatment: | Control no water | Control water only | Supplement |
|---|---|---|---|
| Live wt loss % | 7.2 | 3.9 | |

The supplement of the present invention was effective in decreasing live weight loss in animals coming off pasture, which experience antemortem-like stresses of transport and handling.

Example 4

This example is included to demonstrate the efficacy of the solid supplements on live weight loss in cattle experiencing long distance transport. The international trade in cattle for countries like Canada is growing. These animals often experience handling and transport times in excess of 48 hours (most cattle transport is 1–3 hours). Fifty seven crossbred steers and heifers weighing 450 Kg(av) were used. The animals were fed a standard feedlot ration. Three treatment groups were used—a control (water only), group one (solid supplement 1(b) offered 36 hours pre-transport plus liquid consumable supplement 1(a) offered after the first transport period), and group two (solid supplement 1(b) offered 36 hours pre-transport). On the day of the experiment, the cattle were transported for four hours, left on the transport carriers overnight (to simulate a border inspection) and transported an additional four hours on the second day. Live weight loss results are set out in Table 4. It is evident that the supplements of the present invention are effective in reducing live weight loss in long distance transported cattle. The supplements are preferably provided pre-transport, and if distance is lengthy, during transport.

TABLE 4

| Treatment: | Control water only | Group 1 solid + liquid | Group 2 solid |
|---|---|---|---|
| No. animals | 16 | 20 | 21 |
| live wt loss % | 4.82 | 3.25 | 3.53 |
| Kg retained (rel. to control) | — | 8.2 | 6.9 |

Example 5

This example illustrates the efficacy of solid supplements in reducing carcass weight loss when administered to animals prior to transport. The majority of cattle in North America are marketed directly to an abattoir and usually receive no more than 1–3 hours of transport. In this group, weight loss is often 1–3% of their body weight. It would thus be beneficial to the animal and highly economical to try to reduce this weight loss. In this example, 88 market weight steers averaging 500 Kg were divided into 6 groups—a control group (water only), and treatment groups which were fed a solid supplement (supplement 1(d) above) at times of 6, 12, 24, 36, and 48 hours prior to transport. All cattle received approximately 3 hours of road transport and were directly slaughtered at a commercial abattoir. The weight retention results in the carcasses is set out in Table 5. The solid supplement is effective in reducing carcass loss by providing it to the animal prior to transport. Maximum efficacy, in respect of carcass yield, was achieved by offering the supplement to the animals 6–24 hours prior to transport. The longer feeding times prior to transport did not yield signifcantly better results.

TABLE 5

| Treatment: | Control | 6 hr | 12 hr | 24 hr | 36 hr | 48 hr |
|---|---|---|---|---|---|---|
| Hot carcass wt (% farm wt) | 54.83 | 55.75 | 55.72 | 55.59 | 55.40 | 55.18 |
| Kg carcass wt (retained cp to control) | — | 5.0 | 4.5 | 3.8 | 2.9 | 1.8 |

TABLE 1(a)

Aminogram of Nutrient Supplement

| INGREDIENT | AMINO ACID CONTENT (% WT AND GRAMS) | | | | | | | | | | | |
|---|---|---|---|---|---|---|---|---|---|---|---|---|
| grams/head | argi | cyst | glut | hist | isol | leuc | lysi | meth | phen | thre | tryp | vali |
| Tr 4.00 | 0.00 | 0.00 | 0.00 | 0.00 | 0.00 | 0.00 | 0.00 | 0.00 | 0.00 | 0.00 | 99.99 | 0.00 |
| grams | 0.00 | 0.00 | 0.00 | 0.00 | 0.00 | 0.00 | 0.00 | 0.00 | 0.00 | 0.00 | 4.00 | 0.00 |
| B 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| OG 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| CG 146.00 | 2.85 | 1.16 | 13.70 | 1.34 | 2.42 | 9.43 | 1.23 | 1.50 | 3.66 | 2.08 | 0.34 | 2.86 |
| grams | 4.16 | 1.69 | 20.00 | 1.96 | 3.53 | 13.77 | 1.80 | 2.19 | 5.34 | 3.04 | 0.50 | 4.18 |
| SM 60.00 | 1.25 | 0.27 | 19.10 | 1.33 | 1.80 | 3.37 | 2.83 | 0.83 | 1.73 | 1.51 | 0.56 | 2.22 |
| grams | 0.75 | 0.16 | 11.46 | 0.80 | 1.08 | 2.02 | 1.70 | 0.50 | 1.04 | 0.91 | 0.34 | 1.33 |
| WP 140.00 | 0.29 | 0.35 | 11.10 | 0.20 | 0.71 | 1.23 | 0.91 | 0.19 | 0.34 | 0.80 | 0.16 | 0.68 |
| grams | 0.41 | 0.49 | 15.54 | 0.28 | 0.99 | 1.72 | 1.27 | 0.27 | 0.48 | 1.12 | 0.22 | 0.95 |
| Me 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| Th 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| Ly 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| SC 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |

TABLE 1(a)-continued

Aminogram of Nutrient Supplement

| INGREDIENT | AMINO ACID CONTENT (% WT AND GRAMS) | | | | | | | | | | | |
|---|---|---|---|---|---|---|---|---|---|---|---|---|
| grams/head | argi | cyst | glut | hist | isol | leuc | lysi | meth | phen | thre | tryp | vali |
| SUM 350.00 | 5.32 | 2.35 | 47.00 | 3.03 | 5.61 | 17.51 | 4.77 | 2.95 | 6.86 | 5.06 | 5.06 | 6.46 |

TABLE 1(b)

Aminogram for the Premix Product (Nebraska Mix)

| INGREDIENT | AMINO ACID CONTENT (% WT AND GRAMS) | | | | | | | | | | | |
|---|---|---|---|---|---|---|---|---|---|---|---|---|
| grams/head | argi | cyst | glut | hist | isol | leuc | lysi | meth | phen | thre | tryp | vali |
| Tr 5.00 | 0.00 | 0.00 | 0.00 | 0.00 | 0.00 | 0.00 | 0.00 | 0.00 | 0.00 | 0.00 | 99.99 | 0.00 |
| grams | 0.00 | 0.00 | 0.00 | 0.00 | 0.00 | 0.00 | 0.00 | 0.00 | 0.00 | 0.00 | 5.00 | 0.00 |
| B 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| OG 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| CG 185.25 | 2.85 | 1.16 | 13.70 | 1.34 | 2.42 | 9.43 | 1.23 | 1.50 | 3.66 | 2.08 | 0.34 | 2.86 |
| grams | 5.28 | 2.15 | 25.38 | 2.48 | 4.48 | 17.47 | 2.28 | 2.78 | 6.78 | 3.85 | 0.63 | 5.30 |
| SM 75.00 | 1.25 | 0.27 | 19.10 | 1.33 | 1.80 | 3.37 | 2.83 | 0.83 | 1.73 | 1.51 | 0.56 | 2.22 |
| grams | 0.94 | 0.20 | 14.33 | 1.00 | 1.35 | 2.53 | 2.12 | 0.62 | 1.30 | 1.13 | 0.42 | 1.67 |
| WP 75.00 | 0.29 | 0.35 | 11.10 | 0.20 | 0.71 | 1.23 | 0.91 | 0.19 | 0.34 | 0.80 | 0.16 | 0.68 |
| grams | 0.22 | 0.26 | 8.33 | 0.15 | 0.53 | 0.92 | 0.68 | 0.14 | 0.26 | 0.60 | 0.12 | 0.51 |
| Me 2.50 | 0.00 | 0.00 | 0.00 | 0.00 | 0.00 | 0.00 | 0.00 | 99.99 | 0.00 | 0.00 | 0.00 | 0.00 |
| grams | 0.00 | 0.00 | 0.00 | 0.00 | 0.00 | 0.00 | 0.00 | 2.50 | 0.00 | 0.00 | 0.00 | 0.00 |
| Th 0.75 | 0.00 | 0.00 | 0.00 | 0.00 | 0.00 | 0.00 | 0.00 | 0.00 | 0.00 | 99.99 | 0.00 | 0.00 |
| grams | 0.00 | 0.00 | 0.00 | 0.00 | 0.00 | 0.00 | 0.00 | 0.00 | 0.00 | 0.75 | 0.00 | 0.00 |
| Ly 1.50 | 0.00 | 0.00 | 0.00 | 0.00 | 0.00 | 78.00 | 0.00 | 0.00 | 0.00 | 0.00 | 0.00 | 0.00 |
| grams | 0.00 | 0.00 | 0.00 | 0.00 | 0.00 | 1.17 | 0.00 | 0.00 | 0.00 | 0.00 | 0.00 | 0.00 |
| SC 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| SUM 345.00 | 6.43 | 2.61 | 48.03 | 3.63 | 6.37 | 22.09 | 5.08 | 6.04 | 8.33 | 6.34 | 6.16 | 7.47 |

TABLE 1(c)

Aminogram LRS Shrinkless Pellets

| INGREDIENT | AMINO ACID CONTENT (% WT AND GRAMS) | | | | | | | | | | | |
|---|---|---|---|---|---|---|---|---|---|---|---|---|
| grams/head | argi | cyst | glut | hist | isol | leuc | lysi | meth | phen | thre | tryp | vali |
| Tr 4.00 | 0.00 | 0.00 | 0.00 | 0.00 | 0.00 | 0.00 | 0.00 | 0.00 | 0.00 | 0.00 | 99.99 | 0.00 |
| grams | 0.00 | 0.00 | 0.00 | 0.00 | 0.00 | 0.00 | 0.00 | 0.00 | 0.00 | 0.00 | 4.00 | 0.00 |
| B 454.00 | 0.52 | 0.23 | 2.60 | 0.24 | 0.38 | 0.72 | 0.39 | 0.18 | 0.52 | 0.38 | 0.12 | 0.53 |
| grams | 2.36 | 1.04 | 11.80 | 1.09 | 1.73 | 3.27 | 1.77 | 0.82 | 2.36 | 1.73 | 0.54 | 2.41 |
| OG 100.00 | 1.13 | 0.55 | 4.30 | 0.45 | 0.58 | 1.19 | 0.64 | 0.27 | 0.76 | 0.56 | 0.18 | 0.82 |
| grams | 1.13 | 0.55 | 4.30 | 0.45 | 0.58 | 1.19 | 0.64 | 0.27 | 0.76 | 0.56 | 0.18 | 0.82 |
| CG 150.00 | 2.85 | 1.16 | 13.70 | 1.34 | 2.42 | 9.43 | 1.23 | 1.50 | 3.66 | 2.08 | 0.34 | 2.86 |
| grams | 4.28 | 1.74 | 20.55 | 2.01 | 3.63 | 14.15 | 1.85 | 2.25 | 5.49 | 3.12 | 0.51 | 4.29 |
| SM 25.00 | 1.25 | 0.27 | 19.10 | 1.33 | 1.80 | 3.37 | 2.83 | 0.83 | 1.73 | 1.51 | 0.56 | 2.22 |
| grams | 0.31 | 0.07 | 4.78 | 0.33 | 0.45 | 0.84 | 0.71 | 0.21 | 0.43 | 0.38 | 0.14 | 0.56 |
| WP 160.00 | 0.29 | 0.35 | 11.10 | 0.20 | 0.71 | 1.23 | 0.91 | 0.19 | 0.34 | 0.80 | 0.16 | 0.68 |
| grams | 0.46 | 0.56 | 17.76 | 0.32 | 1.14 | 1.97 | 1.46 | 0.30 | 0.54 | 1.28 | 0.26 | 1.09 |
| Me 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| Th 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| Ly 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| SC 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| SUM 893.00 | 8.54 | 3.96 | 59.19 | 4.20 | 7.52 | 21.41 | 6.42 | 3.85 | 9.59 | 7.06 | 5.63 | 9.16 |

TABLE 1(d)

Formula Beef Supplement

| INGREDIENT | AMINO ACID CONTENT (% WT AND GRAMS) | | | | | | | | | | | |
|---|---|---|---|---|---|---|---|---|---|---|---|---|
| grams/head | argi | cyst | glut | hist | isol | leuc | lysi | meth | phen | thre | tryp | vali |
| Tr 4.00 | 0.00 | 0.00 | 0.00 | 0.00 | 0.00 | 0.00 | 0.00 | 0.00 | 0.00 | 0.00 | 99.99 | 0.00 |
| grams | 0.00 | 0.00 | 0.00 | 0.00 | 0.00 | 0.00 | 0.00 | 0.00 | 0.00 | 0.00 | 4.00 | 0.00 |
| B 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| OG 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| CG 150.00 | 2.85 | 1.16 | 13.70 | 1.34 | 2.42 | 9.43 | 1.23 | 1.50 | 3.66 | 2.08 | 0.34 | 2.86 |
| grams | 4.28 | 1.74 | 20.55 | 2.01 | 3.63 | 14.15 | 1.85 | 2.25 | 5.49 | 3.12 | 0.51 | 4.29 |
| SM 25.00 | 1.25 | 0.27 | 19.10 | 1.33 | 1.80 | 3.37 | 2.83 | 0.83 | 1.73 | 1.51 | 0.56 | 2.22 |
| grams | 0.31 | 0.07 | 4.78 | 0.33 | 0.45 | 0.84 | 0.71 | 0.21 | 0.43 | 0.38 | 0.14 | 0.56 |
| WP 160.00 | 0.29 | 0.35 | 11.10 | 0.20 | 0.71 | 1.23 | 0.91 | 0.19 | 0.34 | 0.80 | 0.16 | 0.68 |
| grams | 0.46 | 0.56 | 17.76 | 0.32 | 1.14 | 1.97 | 1.46 | 0.30 | 0.54 | 1.28 | 0.26 | 1.09 |
| Me 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| Th 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| Ly 0.00 | 0.00 | 0.00 | 0.00 | 0.00 | 0.00 | 0.00 | 0.00 | 0.00 | 0.00 | 0.00 | 0.00 | 0.00 |
| grams | 0.00 | 0.00 | 0.00 | 0.00 | 0.00 | 0.00 | 0.00 | 0.00 | 0.00 | 0.00 | 0.00 | 0.00 |
| SC 554.00 | 0.67 | 0.14 | 2.60 | 0.30 | 0.45 | 0.90 | 0.42 | 0.19 | 0.58 | 0.44 | 0.18 | 0.58 |
| grams | 0.31 | 0.78 | 14.40 | 1.66 | 2.49 | 4.99 | 2.33 | 1.05 | 3.21 | 2.44 | 1.00 | 3.21 |
| SUM 893.00 | 8.76 | 3.14 | 57.49 | 4.32 | 7.71 | 21.94 | 6.34 | 3.81 | 9.68 | 7.22 | 5.90 | 9.15 |

LIST OF REFERENCES

Armentano, L. E., and Solorzano, L. E. 1987. Buffers for dairy cattle: Mechanisms of action as a basis for formulating optimal buffer mixtures. 10th Annual Int. Mineral Conference. Pitman Moore, pp. 53–64

Cole, N. A., Camp, T. H. Rowe, L. D. Jr., Stevens, D. G. and Hutchenson, D. P. 1988. Effect of transport on feeder calves. Am. J. Vet. Res. 49: 178–183.

Eldridge, G. A. 1988a. The influence of abattoir lairage conditions on the behaviour and bruising of cattle. Pages 143–144 in 34th Int. Cong. of Meat Sci. and Technology. Cong. Proc. Part A. Brisbane, Australia.

Fraser, A. F., 1979. The nature of cruelty to animals. Appln. Amin. Ethol., 5: 1–4

Hutcheson, D. P. and Cole, N. A. 1986. Management of transit-stress syndrome in cattle: Nutritional and environmental effects. J. Amin. Sci. 62: 555–560.

Jacob, R., Piwnica-Worms, D., Harnes, C. R. and Lieberman, M. 1985. Electroncutral Na/H exchange may depolarize the membrane potential in steady state. J. Gen. Physoil. 86: 891–895.

Johnston, J. D. and Buckland, R. B. 1976. Response of male holstein calves from seven sires to four management stresses as measured by plasma corticoid levels. Can. J. Anim. Sci. 56: 727–732.

Jones, S. D. M., Schaefer, A. L., Tong, A. K. W. and Vincent, B. C. 1988. The effects of fasting and transportation on beef cattle. 2. Body components changes. Carcass composition and meat quality. Livest. Prod. Sci. 20: 25–35.

Jones, S. D. M., Schaefer, A. L., Robertson, W. M. and Vincent, B. C. 1990. The effects of withholding feed and water on carcass shrinkage and meat quality in beef cattle. Meat Sci., 28: 131–139.

Jones, S. D. M. and Tong, A. K. W., 1989. Factors influencing the commercial incidence of dark cutting. Can. J. Anim. Sci., 69: 649–654.

Kenny, F. J. and Tarrant, P. V. 1987. The physiological and behavioural responses of crossbred Friesian steers to short-haul transport by road. Livestock. Prod. Sci. 17: 63–75.

Kent, J. E. and Ewbank, R. 1986. The effect of road transportation on the blood constituents and behaviour of calves III. Three months old. Br. Vet. J. 142: 326–335.

Kilgour, R., 1988. Behaviour in the pre-slaughter and slaughter environments. 34th Int. Congr. Meat Sci. Technol., Congr. Proc. Part A. Brisbane, Australia, pp. 130–138.

Locatelli, A., Anges, F. and Sartorelli, P. 1987. Effects of road and simulated transportation for 30 min on blood values in calves. Archivio Veterinario 38: 81–85.

Mikulik, A., Bibove, J., Zemanova, D. and Dvorak, Z. 1987. The occurence of rapid indentification of DFD bulls. 33rd Int. Cong. Meat Sci. Tech. Proc. Vol. 1. Helsinki: 144–145.

Morisse, J. P., Cotte, J. P. and Huonnic D. 1985. High-pH bullock meat. High sugar pre-slaughter regime. RTVA 211: 27–31.

Ozutsumi, K., Ito, K. S., Kawanishi, T., Yamazaki, T. and Karia. Y. 1984. Physiological changes in body weight and blood characteristics of fattened cattle during fasting from finishing to slaughter. Jpn. J. Zootech. Sci. 55: 735–740.

Post, T. B. 1965. Changes in levels of salivary sodium and potassium associated with the mustering of beef cattle. Aust. J. Biol. Sci. 18: 1235–1239.

Ruppanner, R., Norman, B. B., Adams, C. J., Addis, D. G., Lofgreen, G. P., Clark, J. G. and Dunbar, J. R. 1978. Metabolic and cellular profile testing in calves under feedlot conditions: Minerals, electrolytes and biochemical components—changes over time in feedlot. Am. J. Vet. Res. 39: 845–849.

Schaefer, A. L., Jones, S. D. M., Tong, A. K. W. and Vincent, B. E. 1988. The effects of fasting and transportation on beef cattle 1. Acid-base-electrolyte balance and infrared heat loss of beef cattle. Livest. Proc. Sci. 20: 15–24.

Schaefer, A. L., Jones, S. D. M., Tong. A. K. W. and Young, A. 1990. Effects of Transport and Electrolyte Supplementation on Ion Concentrations, Carcass Yield and Quality in Bulls. Can. J. Amin. Sci. 70: 107–119.

Stermer, R. A. Camp, T. H. and Stevens, D. G. 1982. Feeder cattle stress during handling and transportation. Trans. ASAE (Am. Sco. Agric. Eng.) 25: 246–249.

Unanua, A. P. and Buitrago; J. M. G. 1985. A study of plasma enzymes in fighting bulls killed in spanish bull fights. Reprod. Nutr. Develop. 25: 599–603.

Wajda, S. and Wichlacz, H. 1987. Effect of giving molasses on pH and colour of bull meat. Fleischwirtschaft. 67: 962–964.

Warriss, P. D. 1986. Live animal marketing effects on carcass and meat quality. Proceedings, Agriculture Canada Work Planning Meeting on Meat Quality. Research Program Service, Minister of Supply and Services Canada 1987, Ottawa, Minitoba, October 1986, pp. 7–41.

All publications mentioned in this specification are indicative of the level of skill of those skilled in the art to which this invention pertains. All publications are herein incorporated by reference to the same extent as if each individual publication was specifically and individually indicated to be incorporated by reference.

Although the foregoing invention has been described in some detail by way of illustration and example for purposes of clarity of understanding, it will be obvious that certain changes and modifications may be practised within the scope of the appended claims.

We claim:

1. A method of preventing or treating the effects of antemortem stress in livestock, comprising the steps of:

administering to livestock in need thereof, at a reasonable time prior to slaughter, an antemortem nutrient supplement for livestock comprising:

one or more sources of electrolytes providing each of sodium, potassium and magnesium;

one or more sources of amino acids providing each of alanine, lysine, phenylalanine, methionine, threonine, leucine, isoleucine, valine, and glutamate, all in a bypass form; and a source of tryptophan.

2. The method as set forth in claim 1, wherein each of the sources of amino acids are included in the supplement in amounts sufficient to provide, on a dose basis, a total of at least 0.5 g of each amino acid and 15 g of leucine per 500 kg livestock per day.

3. The method as set forth in claim 2 wherein each of the sources of amino acids are included in the supplement in amounts sufficient to provide a total of at least 0.5 g of each amino acid per 1 kg of supplement, and 15 g of leucine per 1 kg of supplement.

4. The method as set forth in claim 2 wherein each of the sources of amino acids are included in the supplement in amounts sufficient to provide a total of at least 2.0 g of each amino acid per 1 kg supplement, 15 g of leucine, and 40 g of glutamate per 1 kg of supplement.

5. The method as set forth in claim 4, wherein the supplement is in a solid or liquid form and is administered to the livestock as a feed supplement or drench.

6. The method as set forth in claim 5, wherein the livestock being treated are about to be transported or handled and wherein the supplement is administered 6–24 hours prior to transport or handling.

7. The method as set forth in claim 6, wherein the supplement further contains an energy source.

8. The method as set forth in claim 7, wherein the supplement is administered to cattle.

9. The method as set forth in claim 4, wherein the supplement is administered to swine.

10. The method as set forth in claim 7, wherein the bypass amino acids are provided from one or more of distillers grain, alfalfa meal, corn gluten meal, skim milk powder, whey powder, casein, cottonseed meal, feather meal, blood meal, bone meal, meat meal, and fish meal.

* * * * *